(12) United States Patent
Niiya

(10) Patent No.: US 7,194,074 B2
(45) Date of Patent: Mar. 20, 2007

(54) KEY TELEPHONE SYSTEM, KEY TELEPHONE, INTERFACE UNIT, AND TRANSMISSION SCHEME DETERMINATION METHOD

(75) Inventor: Norimasa Niiya, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/993,708

(22) Filed: Nov. 27, 2001

(65) Prior Publication Data

US 2002/0126816 A1   Sep. 12, 2002

(30) Foreign Application Priority Data

Jan. 12, 2001   (JP) ............................. 2001-005559

(51) Int. Cl.
    *H04M 1/00*   (2006.01)
(52) U.S. Cl. ..................... 379/156; 379/157; 379/165
(58) Field of Classification Search ................ 379/156, 379/157, 159, 161, 165, 166, 196, 197, 198, 379/225, 234, 219
    See application file for complete search history.

(56) References Cited

U.S. PATENT DOCUMENTS

| | | | |
|---|---|---|---|
| 4,756,007 A | | 7/1988 | Qureshi et al. |
| 4,759,059 A | * | 7/1988 | Christensen ................ 379/161 |
| 4,850,011 A | * | 7/1989 | Delmege et al. ............ 379/157 |
| 4,956,851 A | | 9/1990 | Wolensky et al. |
| 5,193,089 A | * | 3/1993 | Tsuchida .................... 379/165 |
| 5,319,700 A | | 6/1994 | Mano et al. |
| 5,491,720 A | * | 2/1996 | Davis et al. ................ 375/222 |
| 5,737,390 A | * | 4/1998 | Mano .......................... 379/10 |
| 5,930,312 A | | 7/1999 | Marum |
| 5,943,364 A | | 8/1999 | Yoshida |
| 6,005,846 A | | 12/1999 | Best et al. |
| 6,195,359 B1 | | 2/2001 | Eng et al. |
| 6,263,061 B1 | | 7/2001 | Tanaka et al. |
| 6,343,126 B1 | * | 1/2002 | Stelman .................... 379/93.05 |
| 6,389,065 B1 | | 5/2002 | McGhee |
| 6,424,636 B1 | | 7/2002 | Seazholtz et al. |
| 6,978,000 B2 | * | 12/2005 | Niiya ......................... 379/156 |

FOREIGN PATENT DOCUMENTS

EP   0 154 565   9/1985

(Continued)

OTHER PUBLICATIONS

Niiya, N., "Key Telephone System and Interface Unit For Key Telephone", U.S. Appl. No. 09/758,321, filed Jan. 12, 2001, Containing 31 pages and 9 Sheets of Drawings.

(Continued)

*Primary Examiner*—Quoc Tran
(74) *Attorney, Agent, or Firm*—Finnegan, Henderson, Farabow, Garrett & Dunner, L.L.P.

(57) ABSTRACT

A new key telephone system including a new key telephone and new telephone interface which use a new data transmission scheme has been developed, unlike an old key telephone system including an old telephone and old telephone interface unit which use an old data transmission scheme. The new telephone interface unit and new key telephone are compatible with both the new and old data transmission schemes. Even if, therefore, the new telephone interface unit is connected to the old key telephone, or the old telephone interface unit is connected to the new key telephone, data transmission can be performed by using the old data transmission scheme, thus maintaining compatibility.

6 Claims, 10 Drawing Sheets

FOREIGN PATENT DOCUMENTS

| | | |
|---|---|---|
| EP | 0 880 259 A2 | 11/1998 |
| GB | 2 339 659 A | 2/2000 |
| GB | 2 350 027 A | 11/2000 |
| GB | 2371167 | 7/2002 |
| JP | 2001-28771 | 1/2001 |
| WO | WO 94/28664 | 12/1994 |

OTHER PUBLICATIONS

"Integrated Communications Exchange," http://callmaster.co.uk/ICX.asp, pp. 1-3 (May 22, 2002).

"SM/MED Business LRG Business Voice Activation Software Voice Mail Hotel/Motel/Inn Call Request Any of the Above Information!," http://www.keysystemus.com.Products.html, pp. 1-4 (May 22, 2002).

"LinkPlus Digital Switch Integration," www.spectralink.com/pdf/LinkPlus.pdf, pp. 1-2 (1999).

English abstract for JP 2001-28771, 1 page.

Canadian Office Action of Sep. 25, 2003 citing above listed document (3 pages).

* cited by examiner

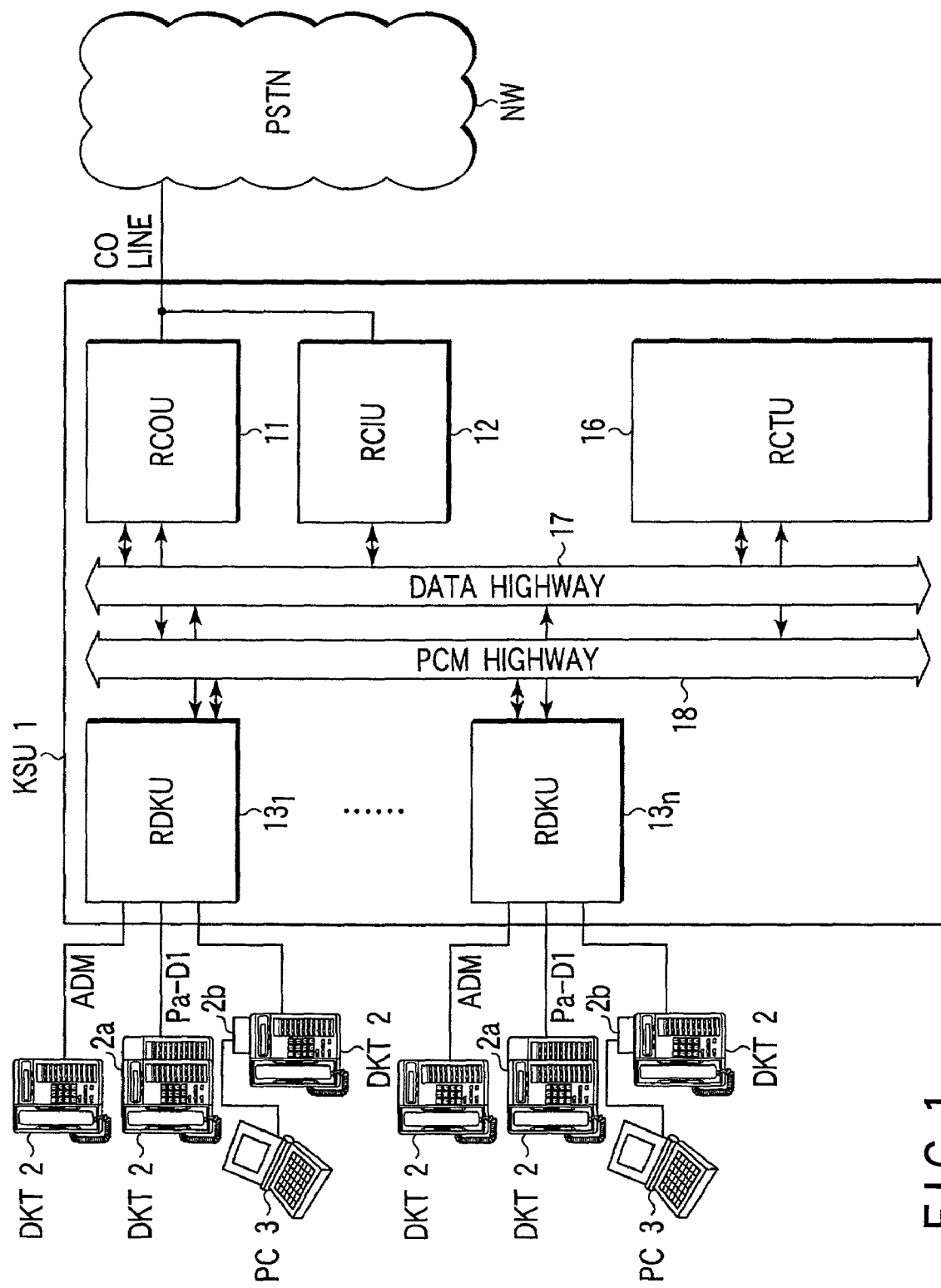
F I G. 1

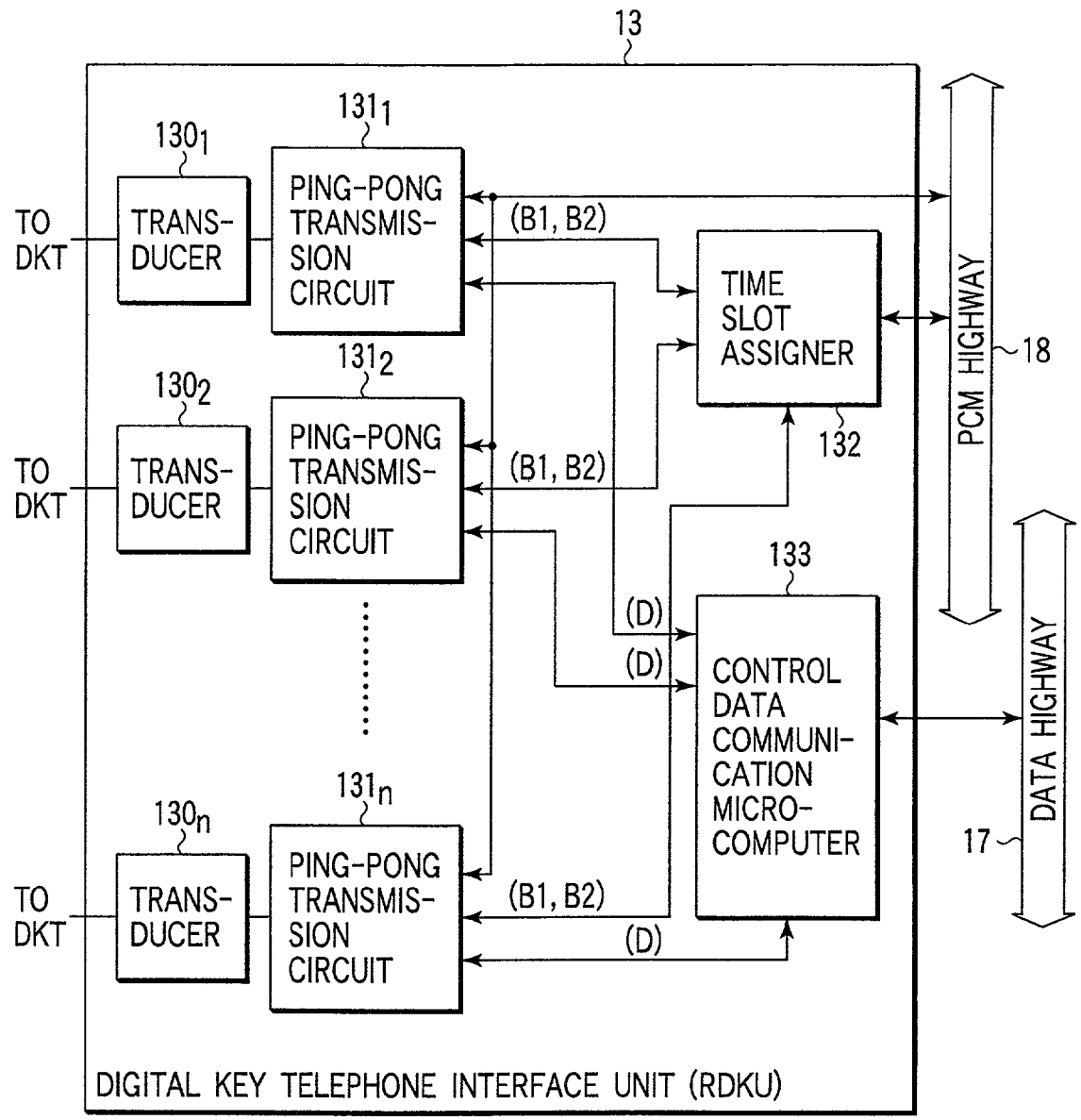
F I G. 2

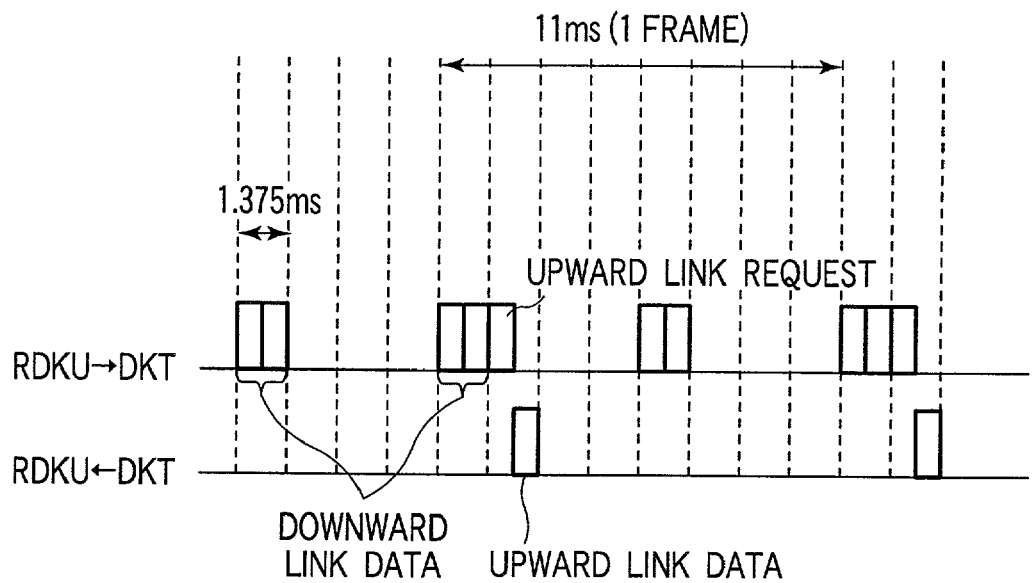
F I G. 12
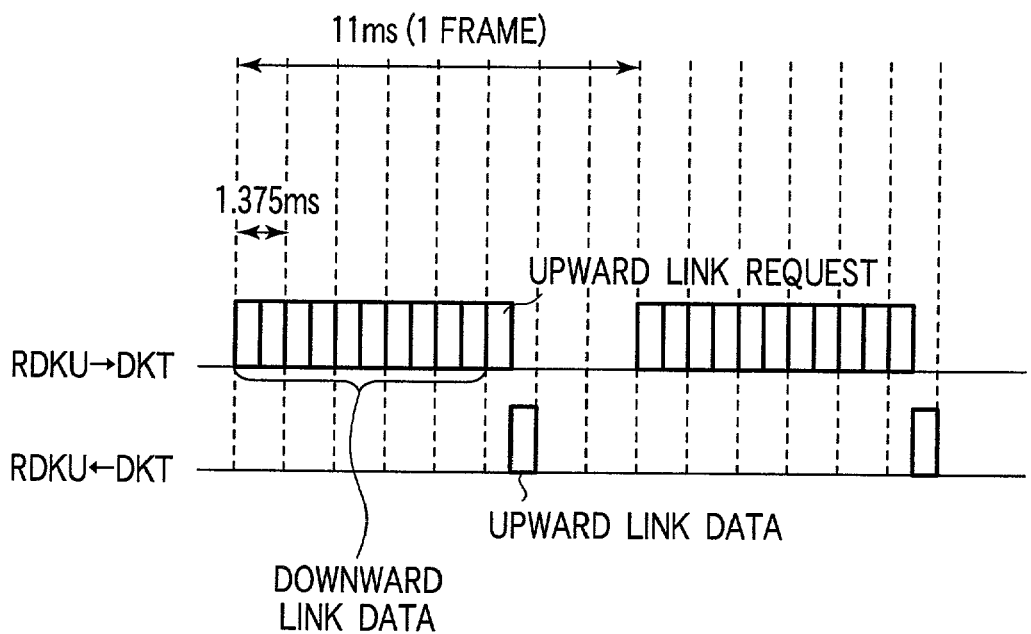
F I G. 13

KEY TELEPHONE SYSTEM, KEY TELEPHONE, INTERFACE UNIT, AND TRANSMISSION SCHEME DETERMINATION METHOD

CROSS-REFERENCE TO RELATED APPLICATIONS

This application is based upon and claims the benefit of priority from the prior Japanese Patent Application No. 2001-005559, filed Jan. 12, 2001, the entire contents of which are incorporated herein by reference.

BACKGROUND OF THE INVENTION

1. Field of the Invention

The present invention relates to a key telephone system, key telephone, interface unit, and transmission scheme determination method and, more particularly, to data transmission between key telephones and a main unit, which realizes compatibility between a conventional key telephone system and a new system.

2. Description of the Related Art

A key telephone system is widely used in an office or the like, in which a main unit including a telephone interface unit accommodating a plurality of key telephones is connected to a public switched telephone network or an office line such as a leased line. Data transmission between each key telephone and the telephone interface unit is performed by a scheme unique to the system. The transmission scheme mainly depends on the transmission rate. New key telephones and main unit (telephone interface unit, in particular) can be separately bought to replace the old ones. If, however, only the telephone interface unit is replaced with a new one for a new system, the old key telephones for the old system cannot cope with the transmission rate required by the telephone interface unit for the new system, wasting the resources of the old system.

According to this conventional key telephone system, new key telephones and telephone interface unit cannot be separately bought to replace the old ones, and the overall system including many key telephones must be replaced with a new one. This imposes a heavy economical load on the user.

BRIEF SUMMARY OF THE INVENTION

Accordingly, it is an object of the present invention to provide a key telephone system and data transmission scheme determination method which allow even one of a key telephone and a telephone interface unit alone to be replaced with a new one while maintaining compatibility in data transmission scheme between the key telephone and a main unit (a telephone interface unit, in particular) and to provide a key telephone and telephone interface unit used in the key telephone system.

According to the embodiment of the present invention, the telephone interface unit in the key telephone system exchanges data with the key telephone by either of the first and second transmission schemes, selects the first transmission scheme when the key telephone is compatible with only the first transmission scheme, and selects the second transmission scheme when the key telephone is compatible with both of the first and second transmission schemes.

This telephone interface unit exchanges data with a plurality of key telephones by different transmission schemes.

The telephone interface unit in the key telephone system transmits a model inquiry to the key telephone by the first transmission scheme, and changes the transmission scheme to the second transmission scheme upon receiving a reply from the key telephone.

This telephone interface unit switches the transmission schemes in accordance with the model of the key telephone.

The telephone interface unit in the key telephone system transmits a model inquiry to the key telephone by the first transmission scheme, and keeps the first transmission scheme unchanged when no response is received within a predetermined period of time.

This telephone interface unit does not change the transmission scheme when the key telephone is of an old model and does not respond to the inquiry.

The key telephone receives a mode inquiry from the main unit by the first transmission scheme, transmits a reply to the mode inquiry to the main unit by the first transmission scheme, and changes the transmission scheme to the second transmission scheme in accordance with an instruction from the main unit.

This key telephone switches the transmission scheme when the main unit is of a new model.

In the key telephone system, the main unit inquires of the key telephone about the transmission scheme, and determines a data transmission scheme between the main unit and the key telephone on the basis of the response.

The data transmission scheme determination method in the key telephone system, comprises setting a main unit and key telephone in a first transmission scheme at an initial time, causing the main unit to transmit a transmission scheme inquiry to the key telephone, causing the key telephone to return a response upon reception of the inquiry, and causing the main unit to determine a data transmission scheme in accordance with contents of the reply upon reception of the reply and instruct the key telephone to change the transmission scheme to the determined data transmission scheme.

An inquiry about a transmission scheme is made between the main unit and the key telephone, and an appropriate transmission scheme is determined in accordance with the inquiry result.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram showing the arrangement of a key telephone system according to an embodiment of the present invention;

FIG. 2 is a block diagram showing the arrangement of a telephone interface unit according to this embodiment of the present invention;

FIG. 12 is a view showing an example of a transmission pattern in the new transmission scheme;

FIG. 13 is a view showing another example of the transmission pattern in the new transmission scheme;

DETAILED DESCRIPTION OF THE INVENTION

Figure 3:
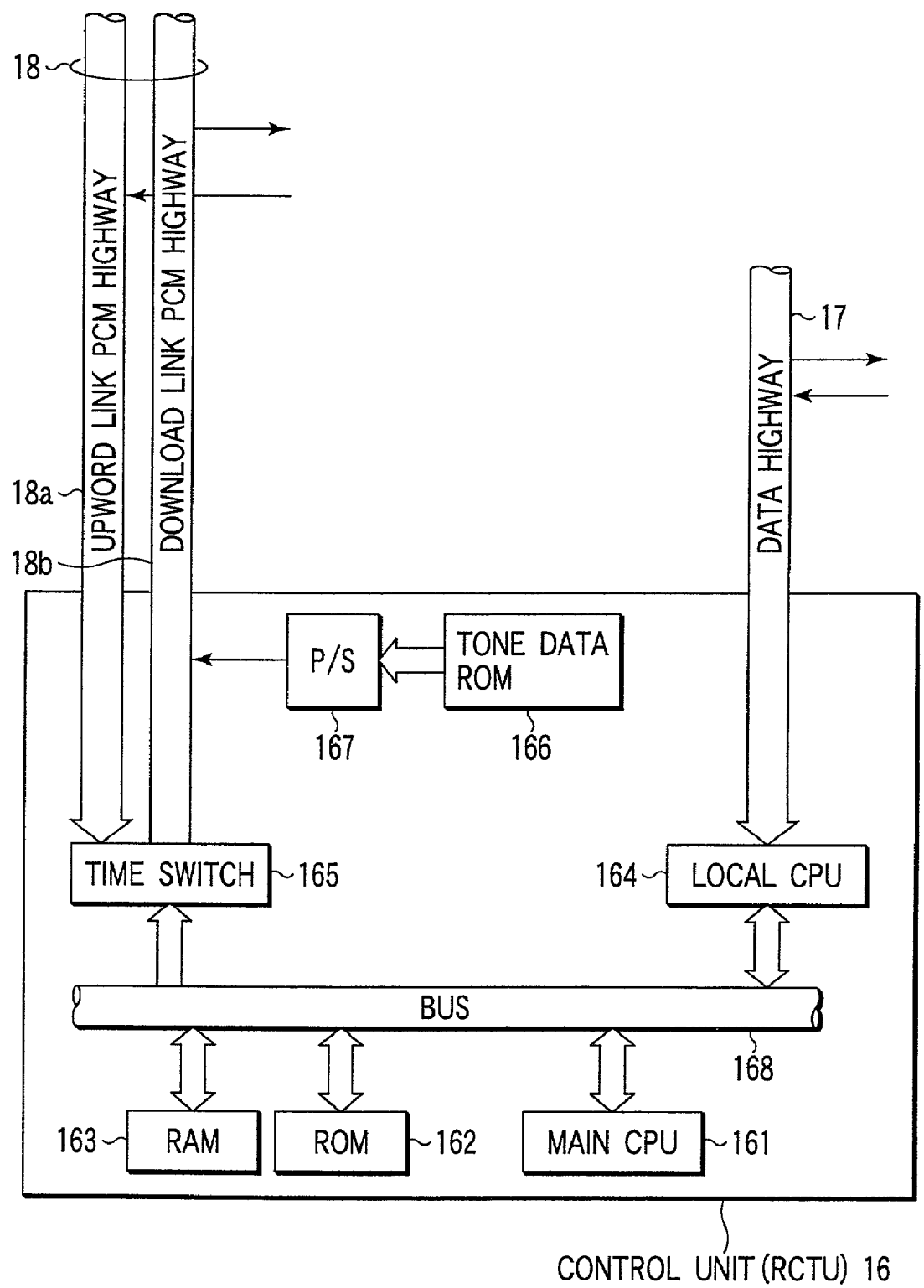
FIG. 3 is a block diagram showing the arrangement of a control unit according to this embodiment.

A preferred embodiment of a key telephone system according to the present invention will now be described with reference to the accompanying drawings.

FIG. 1 is a block diagram showing the arrangement of the digital key telephone system according to an embodiment of the present invention. The key telephone system comprises a main unit (KSU) 1 connected to a public switched telephone network (PSTN) NW through a subscriber line (CO line). Digital key telephones (DKTs) 2 are connected to the extension lines of the main unit 1 as extension terminals.

The main unit 1 comprises an office line interface unit 11 (RCOU), a calling line identification information interface unit (RCIU) 12, digital key telephone interface units (RDKU) $13_1$ to $13_n$ (according to the present invention, each of the RDKU $13_1$ to $13_n$ may have a different transmission speed), and a control unit (RCTU) 16. Each of the digital key telephone interface units $13_1$ to $13_n$ contains a predetermined number of key telephones 2 (in this case, eight). The details of the main unit 1 is described in the copending U.S. patent application Ser. No. 09/125,154 (filed on Aug. 13, 1998), the entire contents of which are incorporated herein by reference.

The interface units 11, 12, and $13_1$ to $13_n$ are connected to the control unit 16 through a data highway 17 and a PCM highway 18. The data highway 17 is used to transmit control data between the units. The PCM highway 18 is used to transmit a digital speech communication signal between the units. The office line interface 11 includes a leased line, a private branch exchange (PBX), and an interface (not shown) connected to another key telephone system.

The central office line interface unit (RCOU) 11 performs an office line interface operation for a public network NW, e.g., call reception detection, polarity inversion detection, opening/closing of a DC loop, dial transmitting, or the like under the control of the control unit (RCTU) 16, and also performs processing of converting an analog speech signal arriving via the subscriber line (CO line) into a PCM signal or processing of converting a PCM signal transferred from the control unit 16 into an analog speech signal and transmitting the speech signal to the subscriber line.

Each of the digital key telephone interface unit (RDKU) $13_1$ to $13_n$ as an interface between the main unit 1 and each of the digital key telephones (DKT) 2 is configured as shown in FIG. 2. The RDKU 13 has ping-pong transmission circuits $131_1$ to $131_n$ corresponding to the number of extension lines. The digital key telephone interface units (RDKU) $13_1$ to $13_n$ may be connected to digital key telephones (DKT) 2 having different transmission speed modes. Each of the ping-pong transmission circuits $131_1$ to $131_n$ performs ping-pong transmission of speech or information terminal data and control data between the RDKU 13 and a corresponding one of the digital key telephones (DKT) 2 by using a time division channel of a (2B+D) scheme, i.e., having two B channels (B1 and B2) with a transmission rate of 64 kbps and one D channel with a transmission rate of 16 kbps. The ping-pong transmission circuit 131 has a (2B+D) generation section and a (2B+D) separation section. The (2B+D) generation section synthesizes speech data and information terminal data on downward link channels B1 and B2 from the PCM highway 18 and control data on a downward link channel D from a control data communication microcomputer 133 into a data packet with a (2B+D) format and transmits the data packet to each of the digital key telephones 2. The (2B+D) separation section separates an upward link data packet arriving from each of the digital key telephones 2 into speech and information terminal data on the upward link channels B1 and B2 and control data on the upward link channel D and transfers the data to the PCM highway 18 and the control data communication microcomputer 133. The B1 channel is assigned to speech data transmission to each of the digital key telephones 2 while the B2 channel is assigned to transmit information terminal data when an information terminal such as a personal computer 3 is connected to each of the digital key telephones 2.

A time slot assigner 132 receives a frame synchronous signal and clock signal from the PCM highway 18 and notifies the ping-pong transmission circuits $131_1$ to $131_n$ of the timing for transmitting/receiving upward and downward link data on the B channel to/from the PCM highway 18. Therefore, each of the ping-pong transmission circuits $131_1$ to $131_n$ directly accesses the PCM highway 18 at the timing assigned by the time slot assigner 132 to transmit/receive upward and downward link data at a transmission rate of 2,048 Mbps. The control data communication microcomputer 133 monitors D channel data transmitted/received by the ping-pong transmission circuits $131_1$ to $131_n$ and controls to transmit/receive the D channel data to/from the control unit 16 through the data highway 17.

The control unit (RCTU) 16 for systematically controlling the operation of the main unit 1 is configured as shown in FIG. 3. The control unit 16 includes a main CPU 161 formed of a microprocessor. The main CPU 161 is connected to a ROM 162, a RAM 163, a local CPU 164, and a time switch 165 through a bus 168. The ROM 162 stores various programs or control data necessary for switching control in advance. The RAM 163 is used to store maintenance data, user data, or control data generated in various control processes. The local CPU 164 controls control data transfer between the main CPU 161 and the data highway 17.

The control unit 16 also includes a tone data ROM 166 and a parallel/serial conversion circuit (P/S) 167. The tone data ROM 166 reads out tone data representing a tone signal to be supplied to the digital key telephones 2 as extension terminals in accordance with an instruction from the main CPU 161 during various services such as holding, transfer, or camp-on. The parallel/serial conversion circuit 167 converts the tone data read out from the tone data ROM 166 as a parallel signal into a serial signal and transmits the signal to the data highway 17.

The time switch 165 performs time slot switching processing between an upward link PCM highway 18a and a downward link PCM highway 18b under the control of the main CPU 161.

Figure 4:
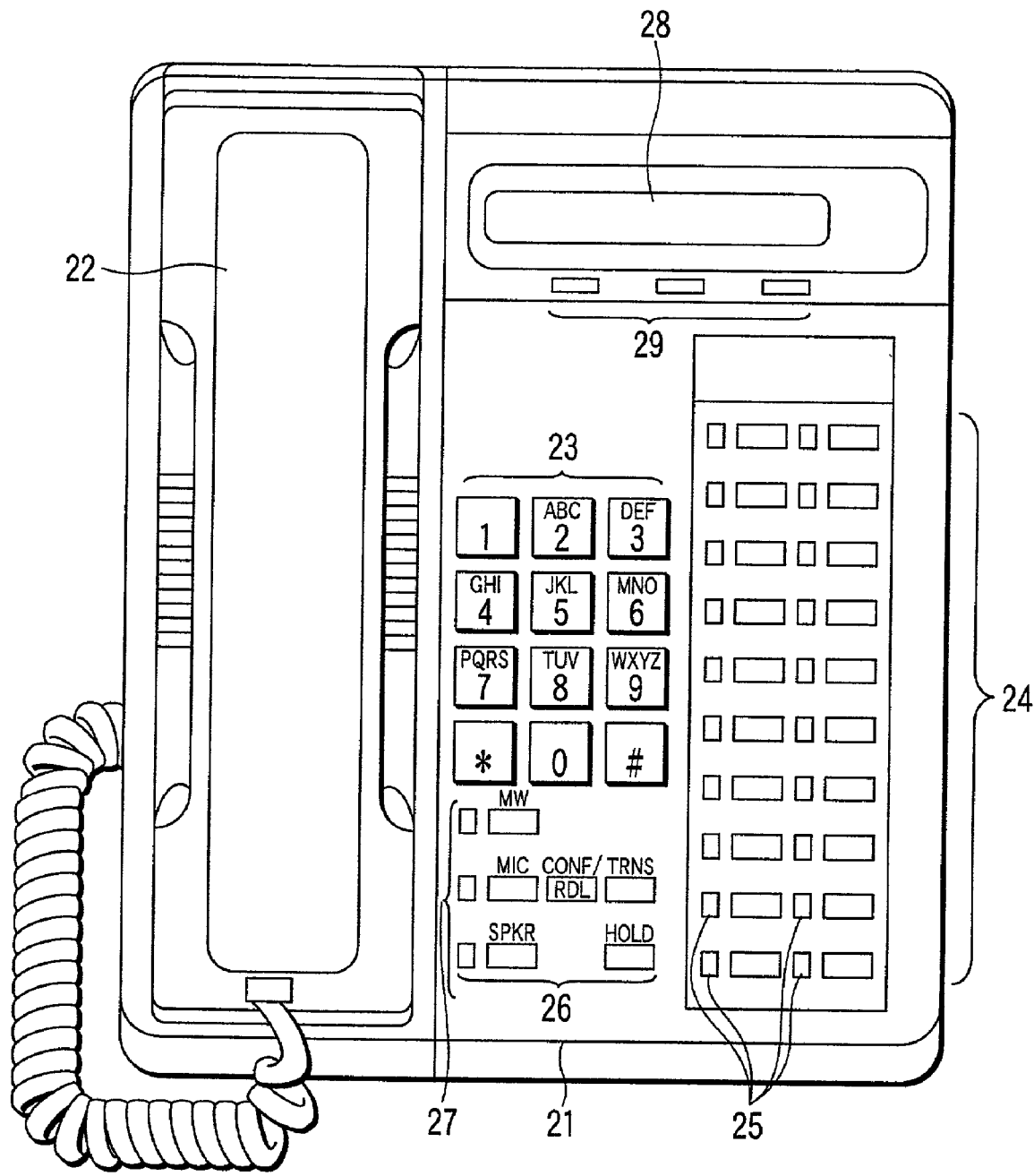
FIG. 4 is a perspective view showing the outer appearance of a key telephone according to this embodiment.
Figure 5:
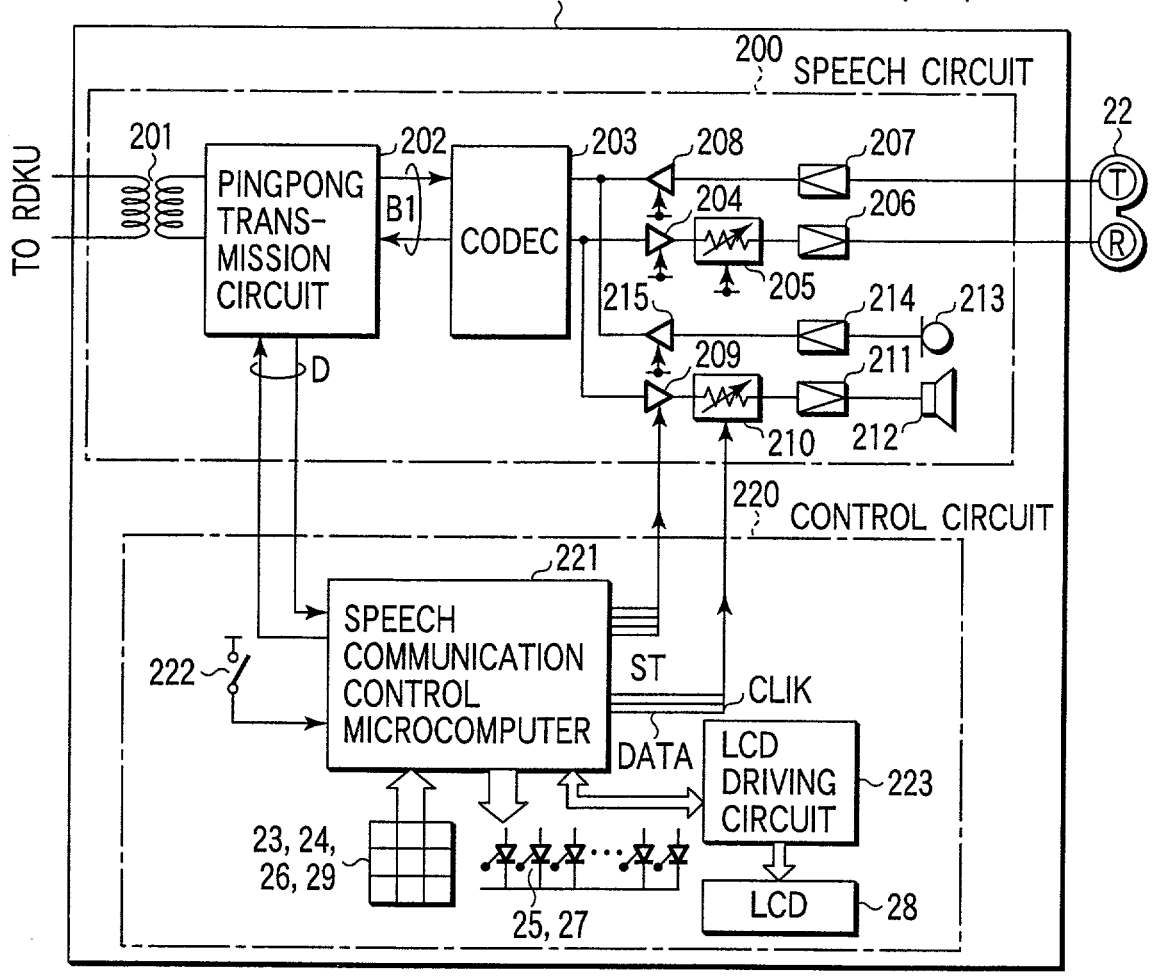
FIG. 5 is a block diagram showing the arrangement of the key telephone according to this embodiment.

FIG. 4 is a plan view showing the outer appearance of each the digital key telephones 2. FIG. 5 is a block diagram showing the circuit arrangement of each of the digital key telephones 2.

As shown in FIG. 4, a handset 22 is mounted on the cradle portion of a telephone body 21. The operation panel of the telephone body 21 has dial buttons 23, a plurality of flexible buttons 24, a plurality of LED display devices 25 respectively corresponding to the flexible buttons 24, a plurality of control buttons 26, LED display devices 27 each corresponding to a predetermined control button, and an LED display device 28. The flexible buttons 24 are used by the user to freely set various functions such as an office line calling or automatic dialing.

Examples of functions to be set other than office line calling are leased line calling, automatic dialing, pause, long pause, automatic redialing, saving, subaddress transmitting, dial transmitting, privacy cancel, messaging, message switching, message waiting, night switching, call reception rejection, absence transfer, fixed absence transfer, camp-on, pooling, park holding, call pickup, call answering, broadcasting, microphone-off, hot line, and conference/transfer.

Leased line calling is used for calling in communication between terminals connected to an intra-office communication network.

For automatic dialing, the telephone numbers of parties to be called are registered in a memory in advance in correspondence with the flexible buttons. Depressing a flexible button allows automatic calling to the corresponding called party. Pause is a function of inserting a pause between, e.g., an office line calling dial number and a called party dial number in abbreviated dialing registration. Long pause is a function of inserting a longer pause. Automatic redialing is a function of automatically repeating redialing when the called party is busy.

In saving, in a period from the end of the dialing operation to the end of the speech communication, a flexible button for which the save function is set is depressed to temporary store the dial number of the called party. After the speech communication is complete, automatic calling to the same called party is allowed by depressing the flexible button for which the save function is set.

Subaddress transmitting is a function used to designate one of a plurality of communication terminal devices connected to one digital line on the side of the other communication party connected to the ISDN.

In dial transmitting, the dial number and subaddress of the called party are input and then sent in calling to the ISDN.

Call reception rejection is a function of rejecting a call from another extension line. When an extension terminal for which call reception rejection is set is called, a busy tone with a period shorter than that of a normal busy tone is returned.

Messaging is a function of registering a message for absence answering in advance and transmitting the message to the calling line upon receiving a call in absence of the called party. Message switching is a function of selecting one of a plurality of messages recorded in advance for absence answering. Message waiting is a function of causing the called terminal to display a message by designating it on the calling side when the called party is busy or absent.

Night switching is a function of switching between extension terminals for receiving a call in the daytime or weekdays and those for receiving a call in the nighttime or holidays.

Absence transfer or fixed absence transfer is a function of registering the extension number of a transfer destination in advance, and when a call is received in the absence transfer mode, automatically transferring the call to the transfer destination.

Absence transfer and fixed absence transfer are different in the following points. In absence transfer, the user can register or cancel the desired transfer destination anytime. In fixed absence transfer, once the transfer destination is set at the time of installation, it cannot be changed later.

Transfer destination setting for absence transfer can be made not only from the extension terminal as the transfer source but also from another extension terminal.

In camp-on, when a called extension terminal or office line terminal is busy, the calling terminal sets camp-on and goes on-hook. After the called terminal completes speech communication, the calling terminal is notified of it. The calling terminal automatically calls the called terminal upon off-hook. When the called terminal answers the call, the called terminal and the calling terminal are connected to allow speech communication.

In pooling, a number of accommodated office lines are divided into groups, and each group is assigned to a pool. By designating one pool, all office lines of the group assigned to the pool can be selectively used. This function is effectively used when there are a lot of office lines, and they cannot be individually assigned to the flexible buttons.

Park holding is a function used to hold speech communication by using the pool. Holding using no pool is performed by depressing a holding button.

Call pickup or call answering is a function of answering an office line call in an extension terminal by a one-touch or special number operation when nobody answers the call. Call pickup and call answering are different in the following points. In call pickup, all office line calls can be answered. In call answering, however, a plurality of office lines are divided into groups, and the call answering function is set for different flexible buttons in units of groups, thereby allowing call answering for each group.

Broadcasting is a function of voice-calling all extension terminals or the extension terminals of a group. The microphone-off function is used when the called party does not want to answer by voice in broadcasting or group call. In this case, the microphone for loudspeaking speech communication is turned off. Privacy cancel is a function of adding a third party to speech communication by a one-touch operation during office line speech communication to allow conference speech communication.

Hot line is a function of calling a desired extension terminal by a one-touch operation. During office line speech communication, by depressing a flexible button for which the hot line function is set, the call can be transferred by voice (call transfer) or a transfer tone (ring transfer). By depressing a flexible button for which conference/transfer is set when the transfer destination party answers the call, the mode changes to an office line conference mode. When the flexible button for which the hot line is set is depressed during extension speech communication, the extension speech communication is held. By depressing the flexible button for which conference/transfer is set when the other party of extension hot line answers the call, the mode changes to the extension conference mode. When the handset goes on-hook in the extension conference mode, the extension call is transferred.

Each of the digital key telephones 2 is formed of a speech communication circuit 200 and a control circuit 220, as shown in FIG. 5. Each of the digital key telephones 2 has, as speech communication modes, a handset speech communication mode using the handset 22 and a hands-free speech communication using a hands-free loudspeaker 212 and a hands-free microphone 213.

When the handset speech communication mode is selected, a transmission signal input by the microphone of the handset 22 is input to a codec 203 through a transmission amplifier 207 and a channel switch 208. When the hands-free speech communication is selected, a transmission signal output from the hands-free microphone 213 is input to the codec 203 through a transmission amplifier 214 and a channel switch 215.

The codec 203 converts the input transmission signal into speech communication data by PCM coding and supplies the speech communication data to a ping-pong transmission circuit 202 as B1 channel data. The ping-pang transmission circuit 202 has a (2B+D) synthesis section. The (2B+D) synthesis section 5 synthesizes the B1 channel speech communication data with D channel control data output from a speech communication control microcomputer 221 (to be described later) to generate upward link transmission data having the (2B+D) format. This transmission data is sent to the RDKU 13 through a transducer 201.

Downward link transmission data having the (2B+D) format, which arrives from the RDKU 13, is input to the ping-pong transmission circuit 202 through the transducer 201. The ping-pong transmission circuit 202 15 has a (2B+D) separation section. The (2B+D) separation section performs processing of separating the downward link transmission data into B1 and B2 channel speech communication data and D channel control data. The B1 channel speech communication data is supplied to the codec 203. The D channel control data is supplied to the speech communication control microcomputer 221.

The codec 203 performs signal processing of PCM-decoding the B1 channel speech communication data to reproduce the reception signal. In the handset speech communication mode, the reception signal is supplied to the loudspeaker of the handset 22 through a channel switch 204, an attenuator 205, and a reception amplifier 206. In the hands-free mode, the reception signal is supplied to the hands-free loudspeaker 212 through a channel switch 209, an attenuator 210, and a reception amplifier 211 and output from the loudspeaker 212.

The control circuit 220 has the speech communication control microcomputer 221. The speech communication control microcomputer 221 systematically performs all control operations associated with speech communication while transmitting/receiving control data to/from the main unit 1. The control contents include an operation of detecting the operation information of the dial buttons 23, the flexible buttons 24, the control buttons 26, and a hook switch 222, ON/OFF-control of the plurality of LED display devices 25 and 27, control of supplying display data to an LCD driving circuit 223 to cause the LED display device 28 to display it, selective ON/OFF-control of the channel switches 204, 208, 209, and 215 in accordance with the speech communication mode, and control of changing the attenuation amount of the attenuator 205 or 210 in accordance with the operation amount of the volume control (not shown). The digital key telephone has a PC interface unit (not shown).

Figure 6A:
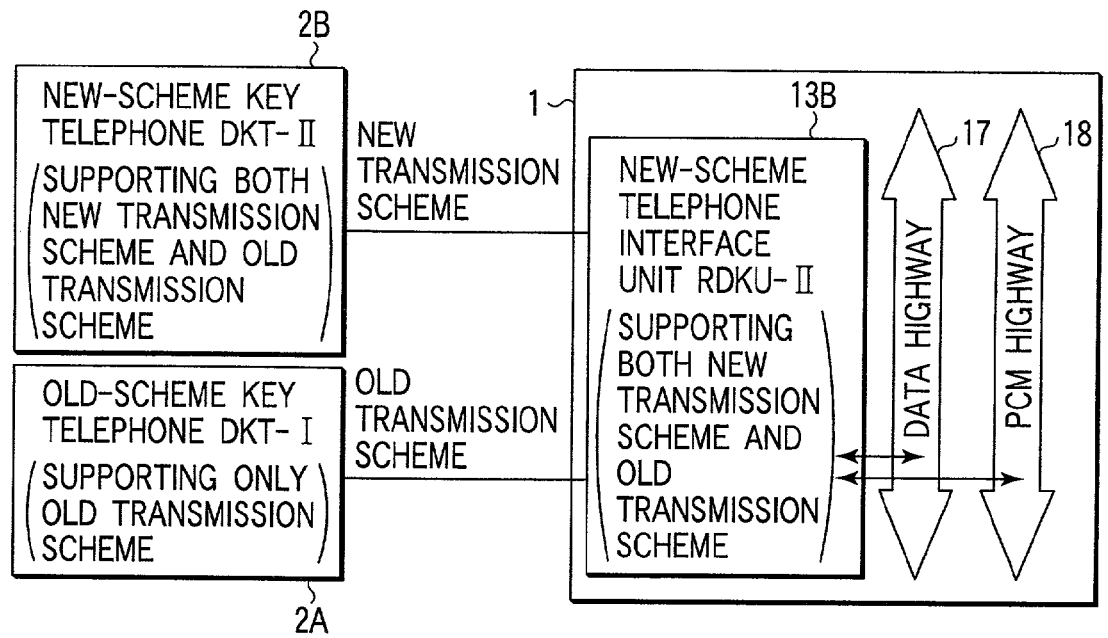
FIGS. 6A and 6B are views showing the arrangement of the key telephone system according to this embodiment.
Figure 6B:
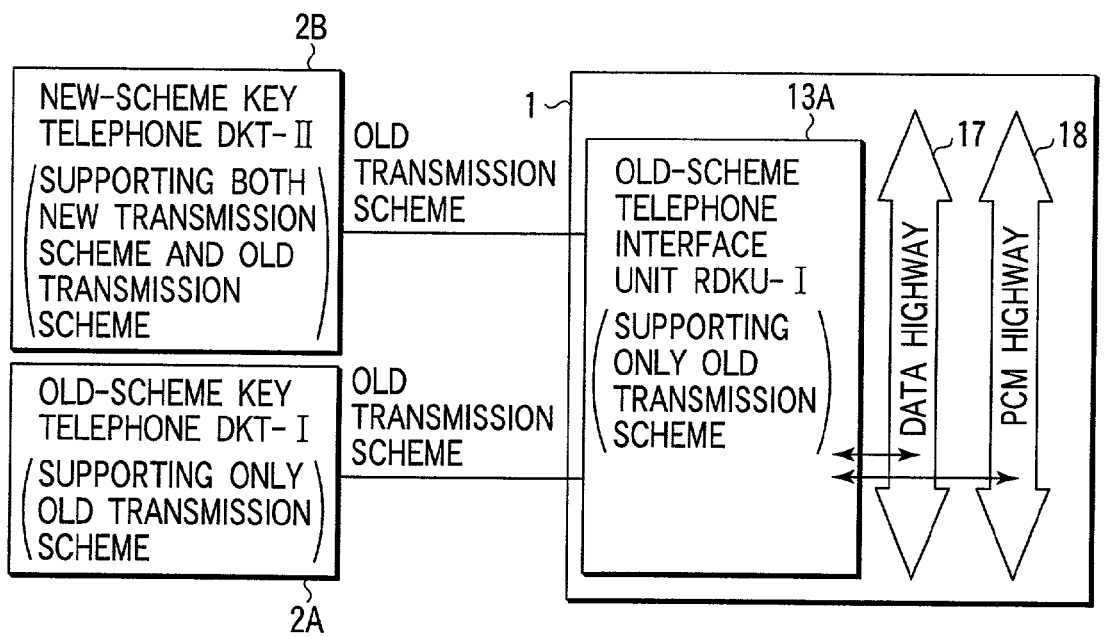

FIGS. 6A and 6B are views showing combinations of new- and old-scheme telephone interface units and new- and old-scheme key telephones. FIG. 6A shows a case where a new-scheme key telephone (DKT-II) 2B and old-scheme key telephone (DKT-I) 2A are connected to the main unit 1 including a new-scheme telephone interface unit (RDKU-II) 13B. Each of FIGS. 6A and 6B shows a telephone interface unit 13 as a single unit. In practice, however, as shown in FIG. 1, a plurality of telephone interface units 13 may be included in the main unit 1; the new- and old-scheme telephone interface units 13A and 13B may included. FIG. 6B shows a case where the new-scheme key telephone (DKT-II) 2B and old-scheme key telephone (DKT-I) 2A are connected to the main unit 1 including an old-scheme telephone interface unit (RDKU-I) 13A.

As described above, since the new-scheme telephone interface unit 13B supports both the new and old data transmission schemes, it exchanges data with the new-scheme key telephone 2B by the new transmission scheme, and exchanges data with the old-scheme key telephone 2A by the old transmission scheme, as shown in FIG. 6A. That is, the new-scheme telephone interface unit 13B serves as a new interface unit only when the new-scheme key telephone 2B is connected thereto, and servers as an old interface unit when the old-scheme key telephone 2A is connected thereto.

The old-scheme telephone interface unit 13A supports only the old data transmission scheme. However, since the new-scheme key telephone 2B supports both the new and old data transmission schemes, the old-scheme telephone interface unit 13A exchanges data with both the new-scheme key telephone 2B and the old-scheme key telephone 2A by the old transmission scheme. That is, the new-scheme key telephone 2B serves as a new-scheme key telephone only when it is connected to the new-scheme telephone interface unit 13B, and serves as an old-scheme key telephone when it is connected to the old-scheme telephone interface unit 13A.

The transmission schemes shown in FIGS. 6A and 6B can be summarized as follows:

| Combination | Transmission Scheme |
| --- | --- |
| Old interface unit & Old key telephone | Old transmission scheme |
| Old interface unit & New key telephone | Old transmission scheme |
| New interface unit & Old key telephone | Old transmission scheme |
| New interface unit & New key telephone | New transmission scheme |

Since the new interface unit and new key telephone are compatible with the old data transmission scheme in this manner, even if they are connected to an old key telephone and old interface unit, they can operate and maintain compatibility with the system before replacement.

To realize this, according to the present invention, when a key telephone is connected, the new-scheme telephone interface unit 13B transmits a model (transmission scheme) inquiry to the key telephone and determines a data transmission scheme for the key telephone in accordance with the reply. At the initial time, both the new-scheme telephone interface unit and key telephone select the old transmission scheme, and the first inquiry is made by the old transmission scheme.

Figure 7:
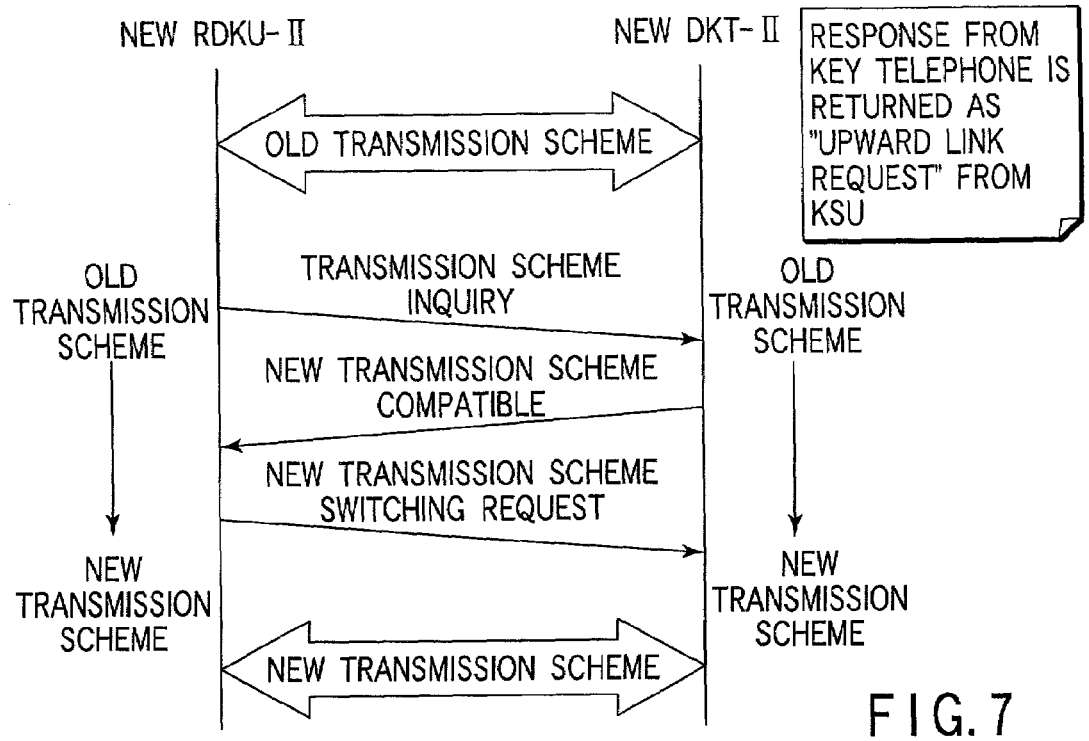
FIG. 7 is a view showing the first example of a transmission scheme determination procedure in the key telephone system according to this embodiment.

FIG. 7 shows a transmission scheme determination procedure in a case wherein the new telephone interface unit (RDKU-II) is connected to the new-scheme key telephone (DKT-II). The new telephone interface unit transmits RDKU-II a "transmission scheme inquiry" to the key telephone DKT-II by the old transmission scheme. The new-scheme key telephone DKT-II returns "new transmission scheme compatible" in response to the "transmission scheme inquiry" from the telephone interface unit RDKU-II. Note that the key telephone DKT-II returns the reply to the telephone interface unit RDKU-II upon reception of an "upward link request" from the telephone interface unit RDKU-II. Upon reception of "new transmission scheme compatible" from the key telephone DKT-II, the new telephone interface unit RDKU-II determines that the key telephone DKT-II is a new-scheme key telephone, and transmits a "new transmission scheme switching request" to the key telephone DKT-II. Thereafter, the new telephone interface unit RDKU-II and new-scheme key telephone DKT-II are switched from the old transmission scheme to the new transmission scheme.

Figure 8:
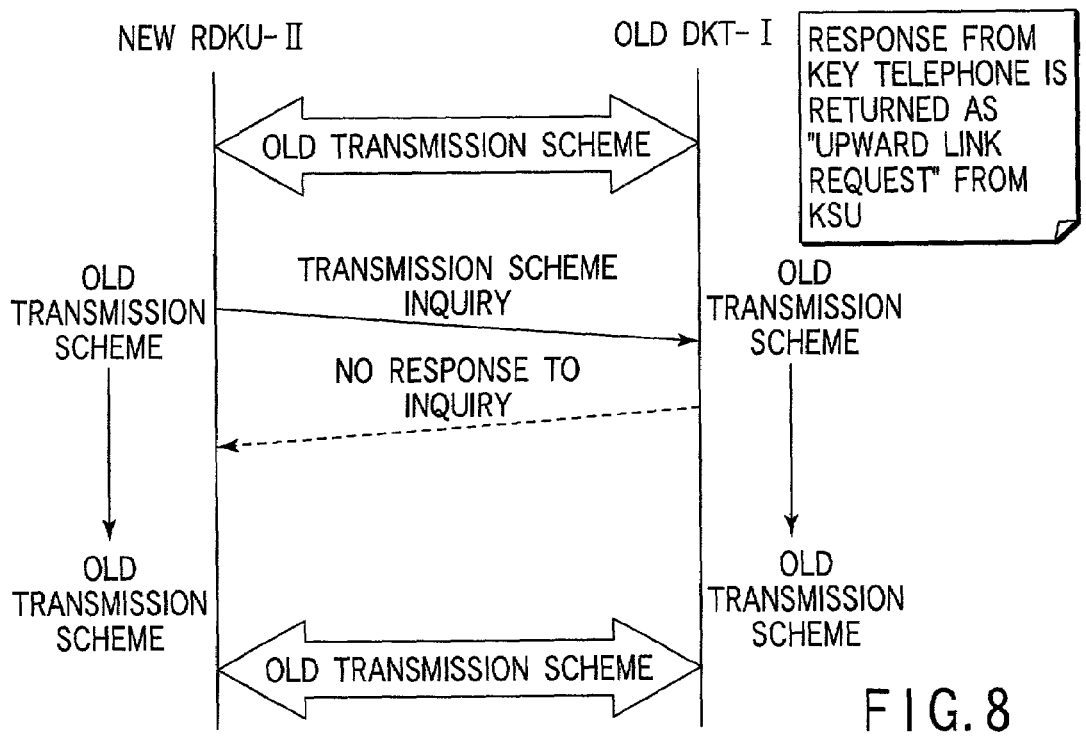
FIG. 8 is a view showing the second example of the transmission scheme determination procedure in the key telephone system according to this embodiment.

FIG. 8 shows a transmission scheme determination procedure in a case wherein the new telephone interface unit (RDKU-II) is connected to an old-scheme key telephone (DKT-I). In this case, even if the old-scheme key telephone DKT-I receives a "transmission scheme inquiry" from the new telephone interface unit RDKU-II, since the "transmission scheme inquiry" is not defined in the old-scheme key telephone DKT-I, the key telephone DKT-I does not understand the meaning of the signal, and makes no response. For this reason, if no response is received a predetermined period of time after the transmission of the "transmission scheme inquiry", the new telephone interface unit RDKU-II determines that the key telephone DKT-I is an old-scheme key telephone, and continues the old transmission scheme.

An example of a transmission scheme will be described below.

Figure 9:
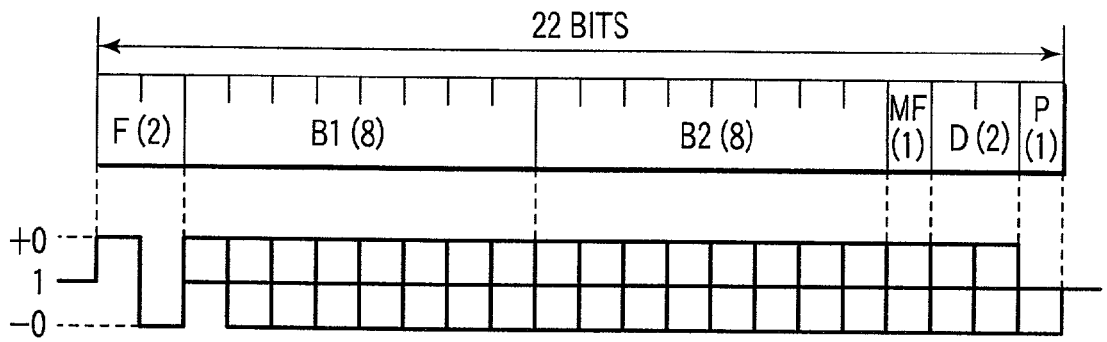
FIG. 9 is a view showing the format of transmission data associated with ping-pong transmission between a key telephone and a telephone interface unit.

FIG. 9 shows the format of data transmitted between the main unit 1 (telephone interface unit 13) and the key telephone 2. One frame for ping-pong transmission is made up of a total of 22 bits, i.e., a start code F (2 bits), B1 and B2 channels (8 bits each), MF bit (1 bit), D channel (2 bits), and parity (1 bit). The start code F is "00". If no speech communication signal exists, both the B1 and B2 channels are "1". The MF bit is "0". The transmission rate of each of the B1 and B2 channels is 64 kbps. The transmission rate of the D channel is 16 kbps. The waveform represents AMI coded data.

Figure 10:
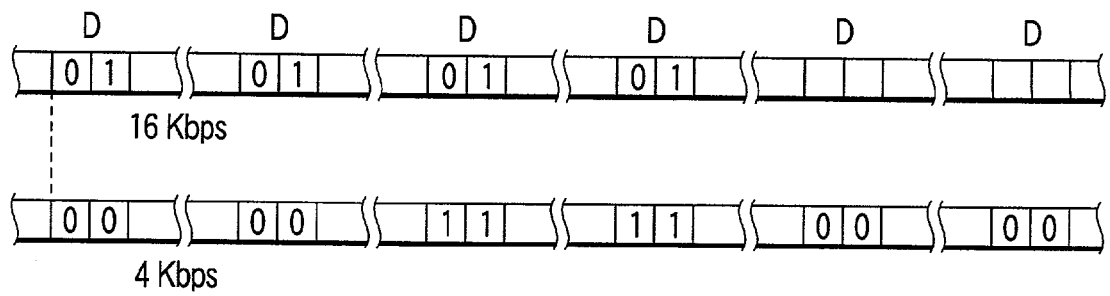
FIG. 10 is a view for explaining a difference between the new and old transmission schemes.

One of the differences between the new and old transmission schemes is in transmission rate. Speech signals are transmitted at a constant transmission rate even in different transmission schemes because they are required to be transmitted in real time. However, control data changes in transmission rate depending on the transmission scheme used. Assume that the transmission rate of the D channel (control data) is 16 kbps in the new scheme; and 4 kbps in the old scheme. A case wherein 1-byte control data "01010101" is transmitted will be considered with reference to FIG. 10. When a transmission rate of 16 kbps is guaranteed, the control data is transmitted upon assigning each bit to a corresponding bit of the D channel. That is, transmission of 1-byte control data is completed in four frames. If, however, the transmission is 4 kbps, the data of each bit must be repeatedly transmitted four times. For this reason, the control data is transmitted upon assigning each bit to a corresponding bit of the D channel of 2 frames. Transmission of 1-bit control data is completed in two frames, and transmission of 1-byte control data is completed in 16 frames.

Figure 11:
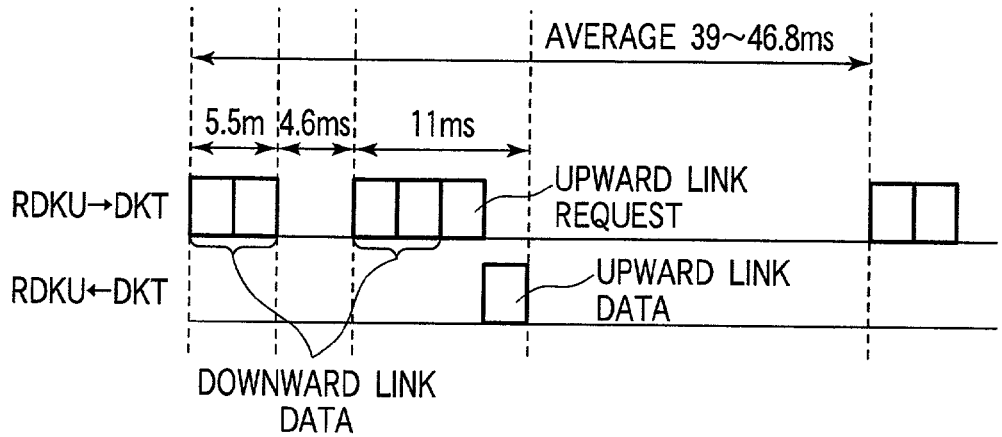
FIG. 11 is a view showing an example of the old transmission scheme.

FIG. 11 shows an example of the old transmission scheme. The subsequent figures (FIGS. 11 to 15) are views with attention being given to only the control data (D channel) of a transmission signal. Each of the CPUs in the key telephone and telephone interface unit extracts only the D-channel bits from the transmission data shown in FIG. 9 to reconstruct control data. The control data obtained this reconstruction is the control data shown in FIGS. 11 to 15.

The transmission frame rate of control data between the telephone interface unit and the key telephone is about 39 to 46.8 ms. One frame of the control data is a fixed-length frame made up of 4-byte downward link data (telephone interface unit→key telephone), 1-byte "upward link request", and 1-byte upward link data (key telephone→telephone interface unit). Note that the 4-byte downward link data is not continuously transmitted but is transmitted such that 2-byte data is transmitted first, and then the remaining 2-byte data is transmitted after a lapse of a wait time (4.6 ms) during which the key telephone performs processing.

FIGS. 12 to 15 show various patterns of the new transmission scheme. In this case, a high transmission rate is set in the new transmission scheme, and the frame rate is 11 ms. Various transmission patterns can be variously set instead of one fixed pattern. Downward link data and upward link data can be extended up to 11 bytes and 9 bytes, respectively.

FIG. 12 shows a transmission pattern for 4-byte downward link data, 1-byte "upward link request", and 1-byte upward link data. This pattern differs from the one shown in FIG. 11 in that the "upward link request" is transmitted from the telephone interface unit immediately after the transmission of the 2-byte downward link data, and the remaining 2-byte data is transmitted with a delay of 4 bytes after the reception of the upward link data.

FIG. 13 shows a transmission pattern for 10-byte downward link data, 1-byte "upward link request", and 1-byte upward link data. The "upward link request" is transmitted from the telephone interface unit immediately after the transmission of the 10-byte downward link data, and then the downward link data is received by the telephone interface unit.

Figure 14:
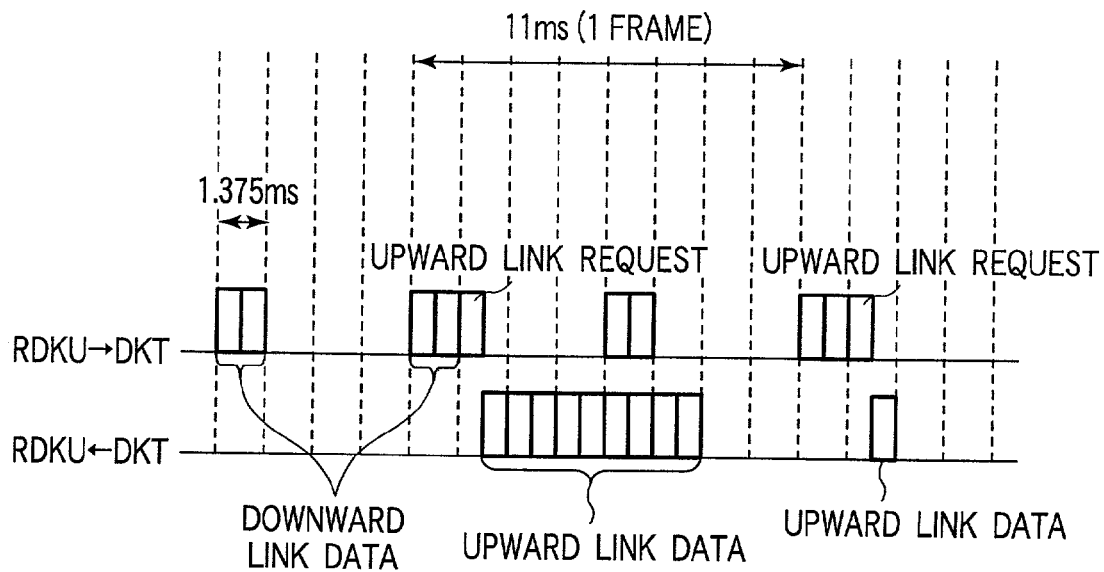
FIG. 14 is a view showing still another example of the transmission pattern in the new transmission scheme.

FIG. 14 shows a transmission pattern for 2-byte downward link data, 1-byte "upward link request", and 9-byte upward link data. The "upward link request" is transmitted from the telephone interface unit immediately after the transmission of the 2-byte downward link, and then the 9-byte upward link data is received by the telephone interface unit.

Figure 15:
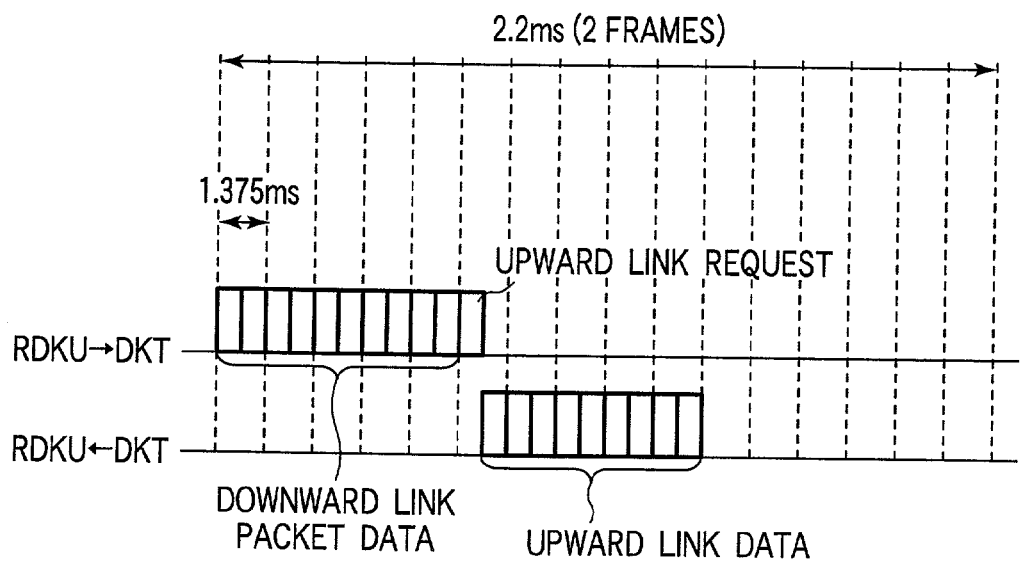
FIG. 15 is a view showing still another example of the transmission pattern in the new transmission scheme.

FIG. 15 shows a transmission pattern for 10-byte downward link data, 1-byte "upward link request", and 9-byte upward link data, in which data is transmitted in units of two frames. The "upward link request" is transmitted from the telephone interface unit immediately after the transmission of the 10-byte downward link data, and then the 9-byte upward link data is received by the telephone interface unit.

The patterns shown in FIGS. 12 to 15 may change for each frame.

The present invention is not limited to the above embodiment and can be variously modified. For example, the transmission schemes shown in the accompanying drawing are merely examples, and the present invention is not limited to them. According to the above description, the two types of transmission schemes, i.e., the new and old transmission schemes are assumed. However, the new scheme is not limited to one; a new telephone interface unit and new-scheme key telephone may be compatible with various transmission schemes.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the embodiment described above includes various aspects of the present invention, and a plurality of constituent elements disclosed can be properly combined to create various inventions. Even if, for example, some constituent elements are omitted from the all the constituent elements in the embodiment described above, the problem to be solved by the present invention can be solved. In this case, if the effect described above can be obtained, the arrangement from which these constituent elements are omitted can be extracted as an invention.

As has been described above, according to the present invention, there is provided a key telephone system which allows only one of a key telephone and a telephone interface unit to be replaced with a new one while maintaining compatibility in data transmission scheme between the key telephone and the telephone interface unit.

What is claimed is:

1. A key telephone system comprising:
   a key telephone; and
   a main unit which inquires of said key telephone about a transmission scheme, and determines a data transmission scheme between said main unit and said key telephone on the basis of a reply, the main unit comprises:
   a communication section configured to communicate data with the key telephone by either of first and second transmission schemes;
   a model determination section configured to determine whether the key telephone is compatible with both of the first and second transmission schemes or only the first transmission scheme;
   a selection section configured to select the first transmission scheme when the key telephone is compatible with only the first transmission scheme, and select the second transmission scheme when the key telephone is compatible to both of the first and second transmission schemes;
   a transmitter configured to transmit a mode inquiry to the key telephone by the first transmission scheme; and
   a mode controller configured to change the transmission scheme to the second transmission scheme upon reception of a response from the key telephone.

2. The key telephone system according to claim 1, wherein the second transmission scheme is higher in transmission rate than the first transmission scheme.

3. The key telephone system according to claim 1, wherein the first transmission scheme includes a fixed transmission pattern for control data, and the second transmission scheme includes a transmission pattern selected from a plurality of patterns for the control data.

4. The key telephone system according to claim 1, wherein said main unit comprises:
   a transmitter configured to transmit a mode inquiry to the key telephone by the first transmission scheme; and
   a mode controller configured to keep the first transmission scheme unchanged when no response is received from the key telephone in a predetermined period of time.

5. The key telephone system according to claim 4, wherein the second transmission scheme is higher in transmission rate than the first transmission scheme.

6. The key telephone system according to claim 4, wherein the first transmission scheme includes a fixed transmission pattern for control data, and the second transmission scheme includes a transmission pattern selected from a plurality of patterns for the control data.

* * * * *